Sept. 20, 1966   W. K. OWENS   3,273,824
SINGLE PASSENGER AIRCRAFT
Filed Feb. 4, 1965
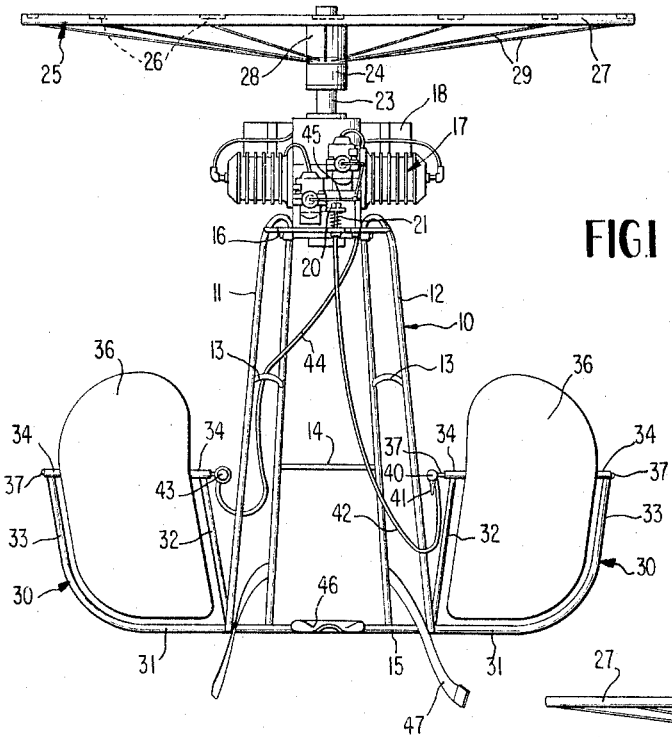
FIG. 1
FIG. 2
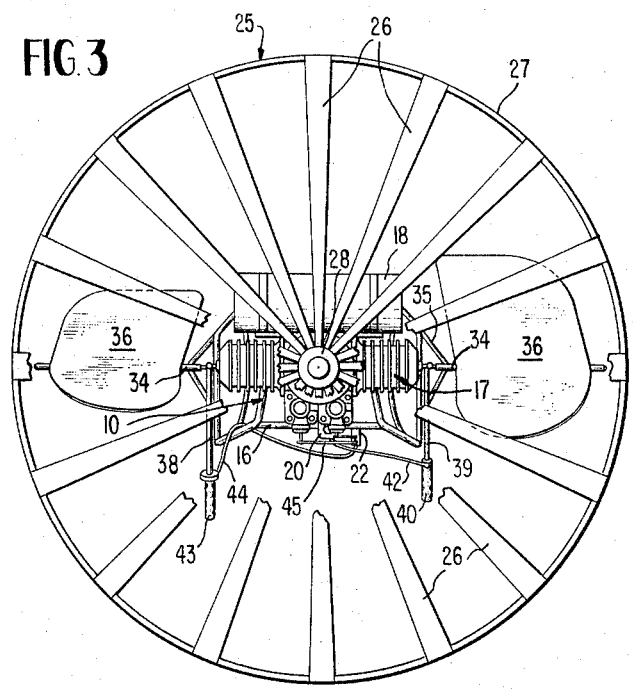
FIG. 3
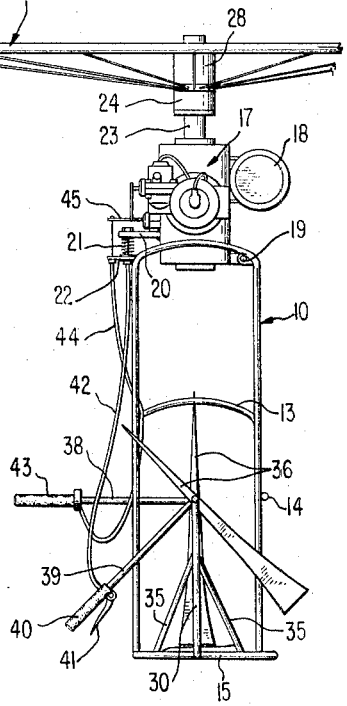
INVENTOR
WALTER K. OWENS
BY B. P. Fishburne, Jr.
ATTORNEY

United States Patent Office 3,273,824
Patented Sept. 20, 1966

3,273,824
SINGLE PASSENGER AIRCRAFT
Walter K. Owens, 4324 Creighton Road, Pensacola, Fla.
Filed Feb. 4, 1965, Ser. No. 430,282
10 Claims. (Cl. 244—4)

This invention relates to an aircraft of the single passenger type.

An important object of the invention is to provide a highly simplified lightweight and economical single passenger aircraft which may find utility commercially and also in the military and sporting fields.

Another object of the invention is to provide a single passenger aircraft which is capable of vertical lift-off and descent, directional flight and hovering and which is equipped with novel manual controls requiring no particular skill to operate.

Another object is to provide an aircraft of the mentioned type which is preferably powered by a small gasoline engine or the like in conjunction with a propulsion rotor which is essentially a modified air screw or propeller as distinguished from a rotary wing or airfoil of the type employed on helicopters. The lift and propulsion of the present aircraft is dependent therefore upon blades of the rotor biting into the air and displacing air in generally the same manner that a conventional propeller drives an airplane.

Another important object of the invention is to provide an aircraft which is safe and which requires no landing gear other than the legs and feet of the user.

Still another object is to provide a single passenger aircraft having a simplified frame structure and body harness means including a seat and shoulder braces and allowing the hands and arms to be free to manipulate directional control.

Other objects and advantages of the invention will be apparent during the course of the following detailed description.

In the accompanying drawing forming a part of this application and in which like numerals are employed to designate like parts throughout the same, FIGURE 1 is a front elevational view of the single passenger aircraft embodying the invention;

FIGURE 2 is a side elevation of the aircraft; and

FIGURE 3 is a plan view thereof, with parts broken away for clarity of illustration.

In the drawings wherein for the purpose of illustration is shown a preferred embodiment of the invention, the numeral 10 designates a frame or body portion formed of lightweight tubing or the like and adapted in its entirety to be supported by and upon the body of the passenger or user of the aircraft. The frame 10 is substantially rigid and includes generally inverted U-shaped vertically elongated opposing frame sides 11 and 12, each carrying a front-to-back curved shoulder-engaging brace bar 13 intermediate its ends. These brace bars 13 may be covered with suitable padding for comfort where they engage the shoulders of the passenger. The frame sides 11 and 12 are further rigidly interconnected somewhat below the shoulder brace bars 13 with a rear transverse brace 14, as shown. A forwardly open horizontal bottom end frame member 15 is rigidly secured to the lower ends of frame sides 11 and 12 and the member 15 is adapted to extend around the rear side of the passenger or user somewhat below the hips. The top of the frame may also be suitably crossbraced as found desirable, at the front and back thereof. One such front crossbrace is shown in FIGURE 1 at 16.

Mounted bodily upon the top of the frame 10 is the aircraft power plant which may comprise a suitable internal combustion engine 17 such as an opposed cylinder two cycle engine or the like. A fuel tank 18 is suitably bodily mounted upon the engine 17 at the rear side thereof as shown in FIGURE 2. The entire power plant is hinged at its bottom and rear side to the top of the frame 10 by suitable pivot shaft 19 supported by bearings which are rigid with the shaft 10. The forward side of the power plant has a forwardly projecting rigid arm 20 which rests upon a compression spring 21 having its lower end engaging a fixed lug 22 on the frame 10. The spring 21 normally supports the power plant in the level position shown in FIGURE 2 but allows the power plant or engine to swing downwardly somewhat at the front and around the axis of the pivot shaft 19 in order to provide directional flight, as will be further described. In effect, the power plant is rigidly although hingedly mounted to the frame 10 at its rear side and has preferably a cushioned or resilient connection with the frame at its forward side, through the spring 21.

An upstanding short output or rotor driving shaft 23 extends above the top of engine 17 and is driven directly thereby and is coupled through a conventional fluid clutch 24 or the like with the propelling rotor 25 of the aircraft.

The rotor 25, as stated, is a modified propeller or air screw and might also be termed a fan. It is relatively small in diameter in comparison to conventional rotary wings employed on helicopters and is essentially a high speed propeller or fan offering much less resistance to turning than the usual rotary wings. Adequate lift is obtained with a smaller diameter by the use of an increased number of pitched blades 26 and by adequate speed to cause these blades to bite into the air and displace a large volume of air downwardly at considerable velocity and continuously during the operation of the rotor. In the present aircraft, there is no necessity for the complex cyclic pitch controls utilized on conventional helicopter rotors and neither is there any necessity for elaborate swivel or universal joints between the rotor and power plant to allow directional inclination of the rotor.

In the construction shown, the rotor 25 includes an outer rim 27 to which the outer tips of the several equidistantly spaced radial fixed pitch blades 26 are anchored. Each blade 26 is provided with a permanent fixed inclination or pitch which may be imparted thereto by somewhat twisting an initially flat blade and anchoring its opposite or inner end to a hub 28, as shown in FIGURE 3. The hub 28 and the rim 27 are preferably interconnected adjacent to and below each rotor blade 26 with a slender diagonal brace rod 29, as shown. While one preferred construction for the fan-type rotor or propeller is shown in the drawings, it should be understood that the details of construction of the rotor may be varied somewhat as found desirab'e. In any event, the engine 17 and directly driven shaft 23 drive the overhead rotor 25, preferably through the medium of a fluid clutch 24, as explained. Both lift and directional flight are achieved with the rotor 25, as will be further explained.

The frame 10 is equipped at its bottom and upon opposite sides with a pair of lateral somewhat inclined generally U-shaped extensions 30 as shown clearly in FIGURE 1, including lower bars 31 which are rigidly connected to the loop or bottom frame member 15. The frame extensions 30 also comprise inner and outer generally upright bars 32 and 33 which carry bearings 34 at their top end rigid therewith. The side frame extensions 30 at their inner sides may be further diagonally braced to the bottom frame member 15, as shown at 35 in FIGURE 2. The tops of the frame extensions 30 are essentially open between the pairs of bearings 34 for the reception of side vertically swingable control elements or fins 36, somewhat in the nature of elevators.

Steering, resistance to spinning due to the torque effect of the rotor 25, and to some extent directional flight is obtained by the manipulation of these control elements 36, which are the principal and only control elements of the aircraft, mounted directly below and in the downward airstream from the rotor 25.

Each control element of fin 36 has a pair of horizontal trunnions 37 on opposite sides thereof engaging rotatably within the bearings 34. The frame extensions 30 and elements 36 are located midway between the forward and rear sides of the frame 10, FIGURE 2, and equidistantly from the vertical center line of the craft in FIGURE 1. The control elements 36 conform to the shapes of the frame extension 30 and project considerably above the tops of these frame extensions and also to points near the extreme lower end of the frame 10. The elements or fins 36 taper toward their upper ends as shown clearly in FIGURE 2.

The control elements 36 are independently swingable vertically on their trunnions 37 through forwardly extending control arms 38 and 39 having their rear ends rigidly secured to the innermost trunnions of the elements 36. The independent tilting of the elements 36 is shown clearly in FIGURE 2.

As shown in the drawings, the control arms 38 and 39 are preferably approximately at right angles to the elements 36 and their relationship is also shown in FIGURE 2, where one control element is inclined and the other one is vertically disposed for the sake of illustration. One control arm, such as the arm 39, is equipped with a handle 40 including a squeeze lever 41 for operating a control cable 42 connected with the power plant arm 20 for pulling the same downwardly to compress the spring 21 and tilt the engine 17 and rotor forwardly and downwardly upon the axis of the pivot shaft 19. When the lever 41 is released, the spring 21 returns the engine 17 and rotor 25 to the normal level position shown in the drawing.

The other control arm 38 may have a rotary handle 43 to operate another control cable 44, leading to and connected with a throttle linkage 45, connected with the engine carbureor or carburetors, as shown in FIGURE 1 and in FIGURE 2. Any other conventional control arrangement between the arms 38 and 39 and the engine throttle and the arm 20 may be employed if preferred, and the construction shown is simply one preferred form of control means.

Within the bottom of the frame 10 and preferably rigid with the back of the member 15 is a seat 46 upon which the passenger is seated while his legs extend freely below the bottom of the frame. A safety belt 47 is provided to be around the waist in the vicinity of the usual belt. Additional flexible harnessing may be provided if desired bu is not necessary for safety. With the bars 13 engaging the shoulders along with the waist belt 47 and the seat 46, the apparatus is firmly anchored to the passenger and is in fact substantially inseparable therefrom until the belt is released. The entire machine can easily be made light enough to be lifted without difficulty and with adequate power for flight.

When the machine is properly connected to the user or passenger, the engine is started to impart rotation to the rotor 25 through the fluid clutch 24. The throttle of the engine and therefore the speed of the rotor is regulated by the handle 43 and control cable 44.

When the rotor turns with sufficient speed, the craft will lift off vertically and by utilizing the squeeze lever 41, the rotor and engine may be tilted forwardly somewhat on the pivot shaft 19 so as to furnish forward directional flight.

Simultaneously, the fan-type propeller or rotor is delivering a rather high velocity airstream downwardly and continuously over the control fins 36 which are directly beneath the rotor. The presence of the elements 36 directly in the strong airstream produced by the rotor renders them very effective in steering, stabilizing and controlling the craft. The attitude of the craft with respect to its vertical axis may be tilted somewhat by tilting the fins 36 and this will also assist in achieving directional flight. The independently operable elements 36 also react to the downward airstream to produce steering in any desired direction, combined with the forward flight caused by tilting the power plant on the hinge shaft 19. Furthermore, the elements or fins 36 serve to counteract any tendency for the frame 10 to revolve under torque influences produced by the rotor and this eliminates the necessity for any stabilizing propeller or rotor as commonly found on helicopters. As previously explained, speed regulation is achieved by manipulating the handle 43.

It is believed that the capabilities and advantages of the aircraft will be apparent to those skilled in the art without the necessity for any further explanation.

It is to be understood that the form of the invention herewith shown and described is to be taken as a preferred example of the same, and that various changes in the shape, size and arrangement of parts may be resorted to, without departing from the spirit of the invention or scope of the subjoined claims.

The invention having thus been described, what is claimed is:

1. An aircraft of the single passenger type comprising a supporting framed adapted to be mounted bodily upon and secured to the body of the passenger, an overhead power plant on said frame having a hinged connection therewith near the back of the frame and including an engine and a substantially vertical axis propelling rotor driven by the engine, a control element connected with the power plant near the front thereof and operable to tilt the power plant upon the axis of the hinged connection, a pair of vertically swingable control elements pivoted to said frame and arranged adjacent the opposite sides thereof directly below said rotor and in the path of the downward airstream produced by the rotor and a control handle element connected with each of said control elements for operating the latter independently, one of said control handle elements including a power plant throttle control.

2. An aircraft of the single passenger type comprising a supporting frame adapted to be secured to the body of the passenger, an engine mounted upon the top of said frame and hinged thereto near the back of the frame for limited tilting relative to the frame, resilient means connected with the engine tending to maintain it level relative to the frame, a control device connected with the engine and operable to tilt the same forwardly in opposition to said resilient means, a substantially vertical axis rotor above and driven by said engine, a pair of upstanding frame extensions secured to said supporting frame on opposite sides thereof and near the bottom of the supporting frame and including bearing parts, a pair of independently operable vertically swingable aircraft control fins pivoted to said bearing parts of said extensions and arranged directly below said rotor and substantially midway between the front and back of the supporting frame and in the path of the downward airstream produced by the rotor, and an operating handle secured to each control fin near the inner side thereof and projecting forwardly of the control fin and near opposite sides of the body of the passenger within the supporting frame.

3. The invention as defined by claim 2, and a seat member on the supporting frame near the bottom thereof and between the sides of the supporting frame to be straddled by the legs of the passenger.

4. The invention as defined by claim 2, and wherein said frame extensions comprise laterally opposite upstanding generally U-shaped structures and said bearing parts comprising aligned horizontal axis tubular elements on the tops of the opposed sides of the U-shaped structures.

5. An aircraft for transporting a single passenger comprising an upright main frame including frame sides to be arranged close to opposite sides of the body of the passenger and extending somewhat above the head of the passenger and adjacent to the hips, shoulder-engaging bars on said frame sides, a bottom frame bar interconnecting the frame sides and being substantially horizontal and U-shaped and open at its forward side and adapted to surround the back and sides of the passenger near the hips, a seat member carried by bottom frame bar to be straddled by the legs of the passenger, flexible harness means on said main frame to secure the passenger therein, a pair of opposite side substantially vertical frame extensions on the main frame at its bottom including aligned bearing parts at the tops of the extensions, vertically swingable upwardly tapering control fins within said extensions and provided intermediate their upper and lower ends with pivot trunnions engaging rotatably in the bearing parts and supported thereby, said frame extensions and fins being substantially midway between the front and back of the main frame, control handle means for said fins in ready reach of said passenger so that the passenger can tilt the fins independently, an overhead power plant on the top of the main frame including a sustaining rotor, and control means in ready reach of the passenger and connected with the power plant.

6. An aircraft comprising a substantially rigid supporting frame adapted to be mounted upon and secured to the body of a user, an overhead power plant on the top of said frame including a sustaining rotor, frame extensions on opposite sides of said supporting frame adjacent the bottom thereof, vertically swingable broad plate-like control fins pivoted to the frame extensions, and independently operable control handle means for said fins, said fins disposed directly below said rotor in the downward airstream thereof.

7. The invention as defined by claim 6, and wherein said power plant has a pivotal connection with the supporting frame, and means connected with said control handle means and with the power plant for tilting the latter.

8. The invention as defined by claim 7, and wherein the last-named means includes a spring yieldably urging the power plant toward a normal level attitude relative to the supporting frame.

9. The invention as defined by claim 7, and additional means connected with the control handle means and also connected with throttle mechanism of the power plant.

10. An aircraft for transporting a single passenger comprising a supporting frame adapted to be secured to the body of the passenger, an overhead power plant on said frame including a vertical axis fan-type sustaining rotor, outboard pivoted control fins on opposite sides of the supporting frame near its lower end directly below said rotor in the downward airstream therefrom, and control handle means for said fins including hand controls for said power plant.

References Cited by the Examiner

UNITED STATES PATENTS

| 2,192,881 | 3/1940 | Bothezat | 244—4 |
| 2,461,347 | 2/1949 | Pentecost | 244—4 |
| 2,640,549 | 6/1953 | Isacco | 244—4 |

FOREIGN PATENTS

| 1,097,804 | 2/1955 | France. |

MILTON BUCHLER, *Primary Examiner.*

L. C. HALL, *Assistant Examiner.*